United States Patent [19]

Dale et al.

[11] Patent Number: 5,020,032

[45] Date of Patent: May 28, 1991

[54] SONOBUOY SUSPENSION SYSTEM

[75] Inventors: John R. Dale, Pennsburg; Lawrence F. Coar, Warminster, both of Pa.

[73] Assignee: United States of America, Washington, D.C.

[21] Appl. No.: 558,263

[22] Filed: Dec. 5, 1983

[51] Int. Cl.[5] .......................... H04B 1/59; B63B 21/52

[52] U.S. Cl. ........................................... 367/4; 367/3; 441/33

[58] Field of Search .......................... 441/21, 3, 26, 33; 367/3, 4

[56] References Cited

U.S. PATENT DOCUMENTS

| | | | |
|---|---|---|---|
| 3,005,215 | 10/1961 | Colt et al. | 441/26 |
| 3,020,567 | 2/1962 | Colt | 441/26 |
| 3,027,539 | 3/1962 | Stillman, Jr. | 367/12 |
| 3,196,469 | 7/1965 | Anthony | 441/26 |
| 3,354,860 | 11/1967 | Dale et al. | 367/3 |
| 3,372,368 | 3/1968 | Dale et al. | 367/3 |
| 3,541,498 | 11/1970 | Dale et al. | 441/33 |
| 3,597,778 | 8/1971 | Castelliz | 441/26 |
| 3,696,325 | 10/1972 | Tallman | 367/3 |
| 3,711,821 | 1/1973 | Dale et al. | 441/22 |
| 3,992,737 | 11/1976 | Duel et al. | 367/3 |
| 4,107,804 | 8/1978 | Bennett | 441/24 |

*Primary Examiner*—Thomas H. Tarcza
*Assistant Examiner*—Daniel T. Pihulic

[57] ABSTRACT

A sonobuoy suspension system is disclosed wherein a spring motor having a substantially constant output torque is mounted within an upper sonobouy unit secured to a buoyant flotation member. Formed from a coiled band, constant force extension spring wound in opposite directions about a pair of rotatable drums so that the spring is extended tangentially therebetween, the motor is coupled to a lower sensor unit by a non-compliant suspension cable for supporting the sensor unit at a predetermined underwater depth substantially isolated from the wave affecting the upper unit and flotation member.

8 Claims, 1 Drawing Sheet

SONOBUOY SUSPENSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to mechanical means for deploying sonobuoys in the water, and more particularly to a compliant suspension system for supporting a sonobuoy sensor at an extended underwater depth with improved wave-motion isolation.

In the deployment of sonobuoy devices in the water, it is critical to optimum acoustic performance to suspend an associated acoustic sensor, usually a hydrophone, in a stable position at a predetermined depth below the water surface. Typically suspended from a buoyant float using a compliant cable member, the acoustic sensor is generally sensitive to vertical motion imparted through the cable member by surface waves affecting the float. This vertical wave-motion, particularly when imparted to very sensitive hydrophones, can obscure a desired acoustic target signal, and, as a result, wave-motion isolation of the submerged hydrophone is essential for providing effective acoustic surveillance.

Wave-motion isolation of the submerged hydrophone has generally been provided using a compliant member, typically a cable of an elastic material, to suspend the hydrophone from the surface float at a substantially fixed vertical level regardless of the frequency and amplitude of wave movement acting on the float. Coupled with mass dampers as required, these compliant suspension cables of elastic material, such as surgical rubber, have frequently been used to provide satisfactory wave-motion isolation for relatively light sonobuoys having submersible hydrophone units of small wet weights of less than about 10 pounds. However, with the increased use of heavier, active sonobuoys having hydrophone units of wet weights in the range of 30–40 pounds or greater, such elastic cable materials have proven to be cumbersome and inefficient, generally requiring the use of tubing of a very large diameter as the compliant member to support the larger wet weights. Unless a very extended length of such tubing is employed as the suspension cable for the larger hydrophone units, the wave-motion isolation provided is significantly degraded due to the relatively high spring constant that results from the nonlinear elasticity typical of many of these materials. Since the suspension systems of current sonobuoys are typically required to be packaged within a limited volume, the wave-motion isolation provided by the larger, heavier buoys using such compliant cable designs has generally been inadequate. More recently, alternative spring-powered suspension systems have been devised to support a variety of submersible loads. However, such spring-powered systems have also failed to provide sufficient wave-motion isolation to the heavier submersed units primarily because of the characteristically high spring factors of these systems at increased loading.

SUMMARY OF THE INVENTION

Accordingly, it is a general purpose and object of the present invention to provide an improved suspension system for supporting a sonobuoy sensor at a predetermined underwater depth substantially isolated from surface wave-motion to permit optimum acoustic performance of the sonobuoy.

A more particular object of the present invention is to provide a compliant suspension system for deploying larger, heavier sonobuoys and their associated sensor units at various depths in the water with a high degree of wave-motion isolation while occupying a small package volume.

Another object of the present invention is to provide a compliant suspension system for sonobuoy deployment that maintains a sufficiently low spring constant with a high load-bearing capability so that heavier hydrophone units may be suspended at selected underwater depths largely unaffected by wave motion.

A further object of the present invention is to provide a compliant sonobuoy suspension system that is simple yet reliable in performance, relatively easy and inexpensive to construct, and readily adaptable to a variety of operations involving underwater deployment of sonobuoys.

Briefly, these and other objects of the present invention are accomplished by a sonobuoy suspension system wherein a spring motor having a substantially constant output torque is mounted in an upper sonobuoy unit adapted to be secured to a buoyant flotation member. Formed from a coiled band, constant force extension spring wound in opposite directions about a pair of rotating drums so that the spring is extended tangentially therebetween, the motor is coupled to a lower sensor unit by a non-compliant suspension cable for supporting the sensor unit at a predetermined underwater depth substantially isolated from the wave motion affecting the upper unit and flotation member.

For a better understanding of these and other aspects of the present invention, reference may be made to the following detailed description taken in conjunction with the accompanying drawing in which like reference characters designate like items throughout the figures thereof.

DESCRIPTION OF THE PREFERRED EMBODIMENT

Figure 1:
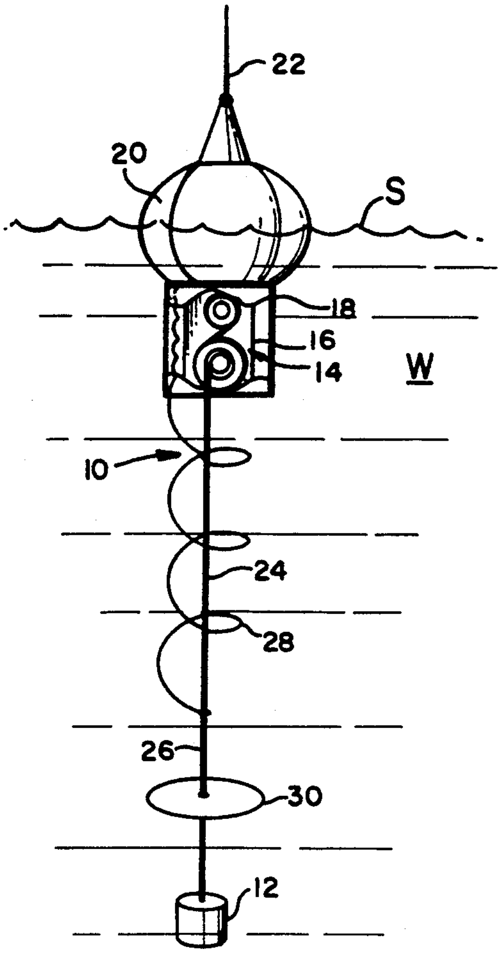
FIG. 1 is a schematic illustration showing a water-deployed sonobuoy employing a suspension system in accordance with the present invention.

Referring now to FIG. 1, a sonobuoy suspension system 10, according to the present invention, is shown deployed in a body of water W for supporting a submerged sonobuoy sensor unit 12, such as a hydrophone, at an extended underwater depth substantially isolated from wave-motion at the water surface S. The suspension system 10 includes a constant torque spring motor 14 mounted upon a plate member 16 within an upper sonobuoy unit 18. Typically a cylindrical structure used to house sonobuoy electronics, such as a receiver/transmitter, the upper unit 18 is secured to a buoyant flotation member 20, such as an inflatable bag, which when deployed in the water W, maintains the upper sonobuoy unit just beneath the water surface S with an antenna 22, electrically coupled to the electronics and mounted upon the upper unit, being positioned above the surface for signal communication.

The upper sonobuoy unit 18 is opened at its lower end to permit the downward extension of a non-compliant suspension cable 24 coupled at one end to the spring motor 14 in a manner described in greater detail hereinafter with regard to FIG. 2. At the opposite end thereof, suspension cable 24 is coupled to sensor unit 12 by a length of insulated signal cable 26 which both serves as a load-bearing member and a means of electrical connection with the sensor unit. As shown in FIG. 1, a helically-wound signal cable 28 made of an insulated spring steel or copper material having high memory retention is electrically connected at its lower end to the upper end of the length of signal cable 26 at its joint with suspension cable 24. Helically-wound to facilitate storage in and downward deployment from the upper sonobuoy unit 18, signal cable 28 is electrically connected at its upper end to the sonobuoy electronics thereby providing an electrical link between the electronics and sensor unit 12. A thin disc-like member 30 shown axially secured to the length of signal cable 26 in the proximity of sensor unit 12 is preferably employed to serve as a mass damper for the suspension system 10, hydrodynamically attenuating those dominant frequencies of wave motion affecting the system.

It should be understood that the length of signal cable 26 between the suspension cable 24 and sensor unit 12 may be minimized or, as a further alternative, eliminated by mechanically connecting the suspension cable and electrically connecting the helically-wound signal cable 28 directly to the sensor unit. In the latter alternative, the disc-like member 30 used as a mass damper would be secured along the suspension cable 24 proximate to sensor unit 12 with the helically-wound signal cable 28 being deployed thereabout.

Figure 2:
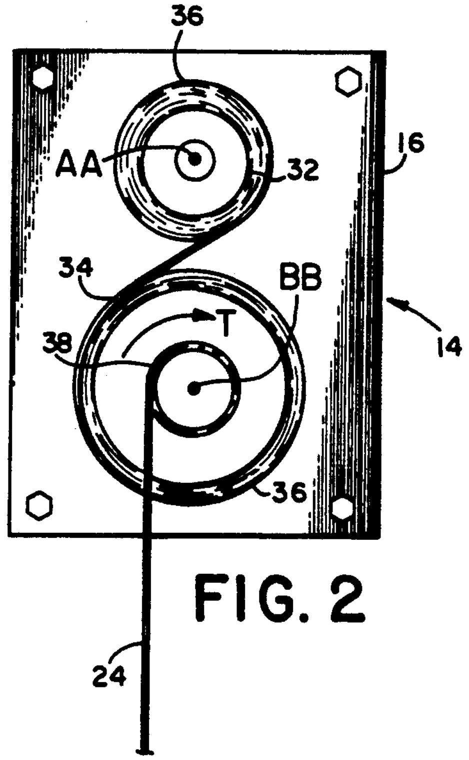
FIG. 2 is an enlarged side view of a portion of the suspension system shown in FIG. 1.

Referring no to FIG. 2 in conjunction with FIG. 1, spring motor 14 comprises a coiled band, constant-force extension spring 36 made of a prestressed strip of flat spring stock, preferably a stainless or high-carbon spring steel, the length of which is wound tightly in opposite directions around a take-up drum 32 and a larger output drum 34, each rotatably mounted on separate axes AA and BB that are substantially parallel to each other. Typically, the spring 36, in its prestressed, coiled configuration, is mounted onto but not fastened to the smaller take-up drum 32, the inner end of the spring normally being able to firmly grip the drum at less than full spring extension. The outer end of spring 36 extended from its natural coiled position about take-up drum 32 is anchored to output drum 34, the spring being wrapped backwards counter to its relaxed curvature. Thus, the spring 36 may be progressively transferred from take-up drum 32 to output drum 34 by its forced rotation, in a counter-clockwise direction as seen in FIG. 2, in which case the spring is continually pulled straight tangentially between the drums before being wrapped about the output drum. This type extension of spring 36, in view of its prestressed curved condition, causes only the strip of material passing tangentially between drums 32 and 34 to undergo a change in stress and be capable of exerting any force in resistance to its extension. As a result, the resistance force exerted by spring 36 is substantially constant throughout its extension and may be preselected, at the time of fabrication of the spring, to provide a desired resisting force based upon the actual wet-weight load of the sensor unit 12 being deployed.

Figure 3:
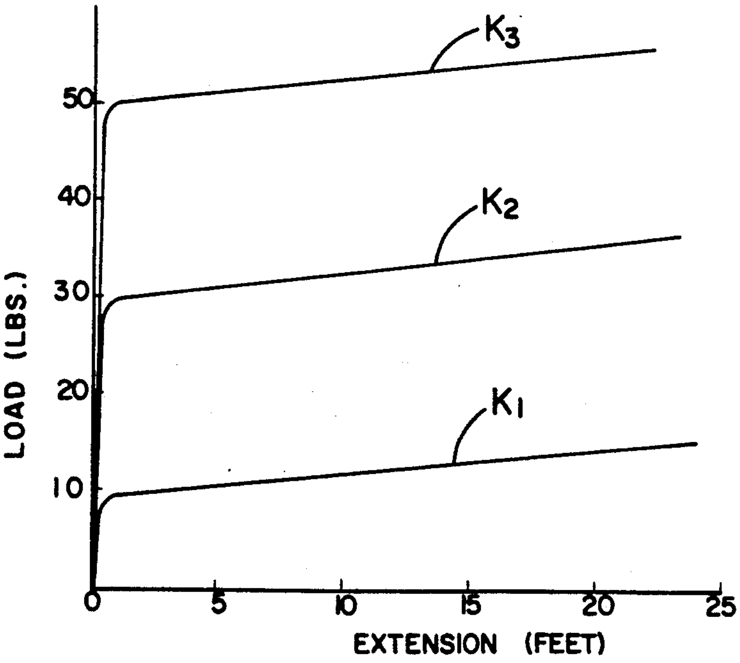
FIG. 3 is a graphical representation of the general load-deflection characteristics for the suspension system of the present invention.

Graphically shown in FIG. 3, spring 36, when extended as described above, characteristically exhibits a very low spring factor ($K_1$, $K_2$, $K_3$) at various levels of loading. Also referred to as the gradient, spring factor K is expressed in terms of pounds of load per unit-measure of deflection, and in the case of the present sonobuoy suspension system 10, should be maintained as close to zero as possible. A commercially available version of the described constant-force extension spring 36 suitable for use in the present suspension system 10 is the Negator Spring manufactured by Ametek, Inc. A similar constant-force spring is also available from the Vulcan Spring and Manufacturing Company.

Referring again to FIG. 2, a spool member 38 for coupling suspension cable 24 to spring motor 14 is extended coaxially from output drum 34 and affixed thereto so that the spool member rotates concomitantly with the output drum about its axis BB. A predetermined length of the suspension cable 24 is secured to and wrapped about the spool member 38 so that the weight of the attached sensor unit 12 can apply a sufficient wind-up torque to output drum 34 in a downward direction upon water deployment. Conventionally released from upper sonobuoy unit 18 automatically upon water impact, the sensor unit 12 via its wet-weight load pays out the proper length of suspension cable 24 during its descent in the water W and thereby winds-up output drum 34 with an associated extended length of spring 36 transferred from take-up drum 32, preferably about one-half of total spring extension, upon reaching full descent. Thus, in the fully deployed suspension system 10, as seen in FIG. 1, spring motor 14 exerts a substantially constant torque T via output drum 34 due to the tendency of the extended constantforce spring 36 to revert to its natural prestressed configuration about the take-up drum 32 the output torque exerted by the motor being designed and preselected to substantially counter that exerted upon the output drum by the wet-weight load of sensor unit 12 at its extended underwater depth. Wave motion at the surface S is accommodated by the following of flotation member 20, with the resulting force variations on the lowered sensor unit 12 being virtually eliminated by the isolation effect of the near-zero spring factor K of motor 14.

Therefore, it is apparent that the disclosed invention provides an improved suspension system for supporting a sonobuoy sensor unit at a predetermined underwater depth substantially isolated from surface wave-motion thereby permitting optimum acoustic performance of the sonobuoy. More particularly, the disclosed compliant suspension system improves the deployment of larger, heavier sonobuoys and their associated sensors at extended depths in the water, maintaining a high degree of wave-motion isolation while occupying a small package volume. The disclosed suspension system maintains a sufficiently low spring constant throughout its extended length with a high load-bearing capability so that heavier hydrophone units may be suspended at various underwater depths substantially unaffected by wave-motion. In addition, the present sonobuoy suspension system is simple yet reliable in performance, relatively easy and inexpensive to construct, and readily adaptable to a variety of operations involving underwater deployment of sonobuoys.

Obviously, other embodiments and modifications of the present invention will readily come to those of ordinary skill in the art having the benefit of the teachings presented in the foregoing description and drawings. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. A suspension system for providing wave-motion isolation between a float and a submersible package, comprising:
 a spring means adapted to be connected to the float at one end and to the submersible package at the other end, said spring means having a near-zero gradient throughout the extension thereof and a resisting force substantially equal to the wet weight load of any submersible package at a preselected extended depth.

2. A suspension system according to claim 1, wherein said spring means further comprises:
 a pair of drums rotatably mounted on separate axes substantially parallel to each other; and
 a spring band prestressed and coiled in opposite directions around said drums and extended tangentially therebetween to exert a constant force upon said drums.

3. A suspension system according to claim 2, further comprising:
 a non-compliant cable member adapted to be paid out from said spring means and coupled to the package; and
 a spool member extended coaxially from and affixed to one of said drums for windingly coupling said cable member to said spring means.

4. A suspension system according to claim 2, further comprising:
 a disc axially secured to said cable member in the proximity of the package for hydrodynamically attenuating dominant frequencies of wave-motion affecting the package.

5. A wave-motion isolated sonobuoy, comprising:
 a surface float;
 a submersible sensor unit;
 a spring means adapted to be connected to said float at the other end and to said sensor unit at the other end, said spring means having a near-zero gradient throughout the extension thereof and a resisting force substantially equal to the wet weight load of any sensor unit at a preselected extended depth; and
 a length of non-compliant cable connected to said spring means and adapted to be coupled to the sensor unit.

6. A sonobuoy according to claim 5, wherein said spring motor further comprises:
 a pair of drums rotatably mounted on separate axes substantially parallel to each other; and
 a spring band prestressed and coiled in opposite directions around said drums and extended tangentially therebetween to exert a constant force upon said drums.

7. A sonobuoy according to claim 6, wherein said spring means further comprises:
 a spool member extended coaxially from and affixed to one of said drums for windingly coupling said cable member to said motor.

8. A suspension system according to claim 6, further comprising:
 a disc-like member axially secured to said cable member in the proximity of the package for hydrodynamically attenuating dominant frequencies of wave-motion affecting the package.

* * * * *